US008985820B2

(12) United States Patent
Mazur et al.

(10) Patent No.: US 8,985,820 B2
(45) Date of Patent: Mar. 24, 2015

(54) LIGHTED VEHICLE INTERIOR ACCESSORY ASSEMBLY AND METHOD

(75) Inventors: Lorin A. Mazur, Shelby, MI (US); Darryle R. Woodham, Clarkston, MI (US); Ralph Brink, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 194 days.

(21) Appl. No.: 13/572,454

(22) Filed: Aug. 10, 2012

(65) Prior Publication Data

US 2014/0043838 A1  Feb. 13, 2014

(51) Int. Cl.
*B60Q 3/00* (2006.01)
*B60Q 3/02* (2006.01)

(52) U.S. Cl.
CPC ............ *B60Q 3/0289* (2013.01); *B60Q 3/0266* (2013.01); *B60Q 2500/10* (2013.01)
USPC ............ 362/488; 362/501; 362/490; 362/549

(58) Field of Classification Search
CPC .......... B60Q 3/00; B60Q 3/002; B60Q 3/004; B60Q 3/0216; B60Q 3/0223; B60Q 3/0203; B60Q 3/0266; B60Q 3/0289; B60N 2/46; B60N 2/468; B60N 2/466; B60N 2/4673; B60N 3/02; B60R 13/0262
USPC ......... 362/488–490, 501, 576, 581, 565, 559, 362/555, 479, 485, 495
See application file for complete search history.

(56) References Cited

U.S. PATENT DOCUMENTS

| | | | |
|---|---|---|---|
| 7,370,995 B2 * | 5/2008 | Hein et al. | 362/511 |
| 2011/0235352 A1 * | 9/2011 | Suzuki et al. | 362/490 |
| 2013/0155708 A1 * | 6/2013 | Moberg et al. | 362/488 |

* cited by examiner

*Primary Examiner* — Diane Lee
*Assistant Examiner* — Kenny C Sokolowski

(57) ABSTRACT

A lighted interior accessory assembly for a vehicle includes an interior accessory such as an armrest or console and a plurality of fasteners mounting the interior accessory on the interior panel. A mounting plate has a light pipe mounted thereon and emitting light along the length of the light pipe. The mounting plate is sandwiched between the armrest and the interior panel so that the mounting plate creates a gap between the armrest and the interior panel through which the light pipe emits light into the vehicle interior. Mounting the armrest directly to the door trim without inter-positioning the mounting plate between the armrest and the door trim eliminates the gap and eliminates the light pipe. Accordingly, a vehicle manufacturer can readily include a lighting feature in a luxury version of the vehicle and omit the lighting feature from a standard version of the vehicle.

7 Claims, 2 Drawing Sheets

8,985,820 B2

LIGHTED VEHICLE INTERIOR ACCESSORY ASSEMBLY AND METHOD

FIELD OF THE INVENTION

The present invention relates to a vehicle interior accessory mounted on a vehicle panel, and more particularly an accessory such as an armrest or console having an optional light pipe for creating a halo lighting effect.

BACKGROUND OF THE INVENTION

Motor vehicle interiors are routinely equipped with light fixtures for illuminating the vehicle interior. The interior lighting provides task lighting for the vehicle occupants and contributes to the aesthetics of the vehicle design. The interior lighting may be light fixtures mounted on the interior roof panel, instrument panel, console between the seats, and/or door trim panels.

Motor vehicle manufacturers regularly market both a standard version and a luxury version of the same vehicle model, with the luxury version having additional features not provided on the standard version.

Accordingly, it would be desirable to provide a new and improved structure and method for mounting a vehicle accessory such as an armrest or console on the vehicle interior panel and incorporating an optional light fixture construction so that the lighting feature can be readily provided on the luxury version of the vehicle and omitted from the standard version. It would also be desirable to provide the new and improved interior accessory assembly in a manner that meets the need for cost efficiency in the manufacture and assembly of the motor vehicle interior.

SUMMARY OF THE INVENTION

A lighted interior accessory assembly for a vehicle interior panel includes an interior accessory and a plurality of fasteners mounting the interior accessory on a vehicle interior panel. A mounting plate has a light pipe mounted thereon and emitting light along the length of the light pipe. The mounting plate is sandwiched between the interior accessory and the interior panel so that the mounting plate creates a gap between the interior accessory and the interior panel through which the light pipe emits light into the vehicle interior. Mounting the interior accessory directly to the interior panel without interpositioning the mounting plate between the interior accessory and the interior panel eliminates the gap and eliminates the light pipe. Accordingly, a vehicle manufacturer can readily include a lighting feature in a luxury version of the vehicle and omit the lighting feature from a standard version of the vehicle.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses. The exemplary embodiment pertains to an armrest mounted on a door trim panel, it being understood that the invention herein can be employed in the mounting of other vehicle interior accessories, such as the mounting of an overhead console on the vehicle roof trim panel or the mounting a vehicle seat console on the floor panel between the seats.

Figure 1:
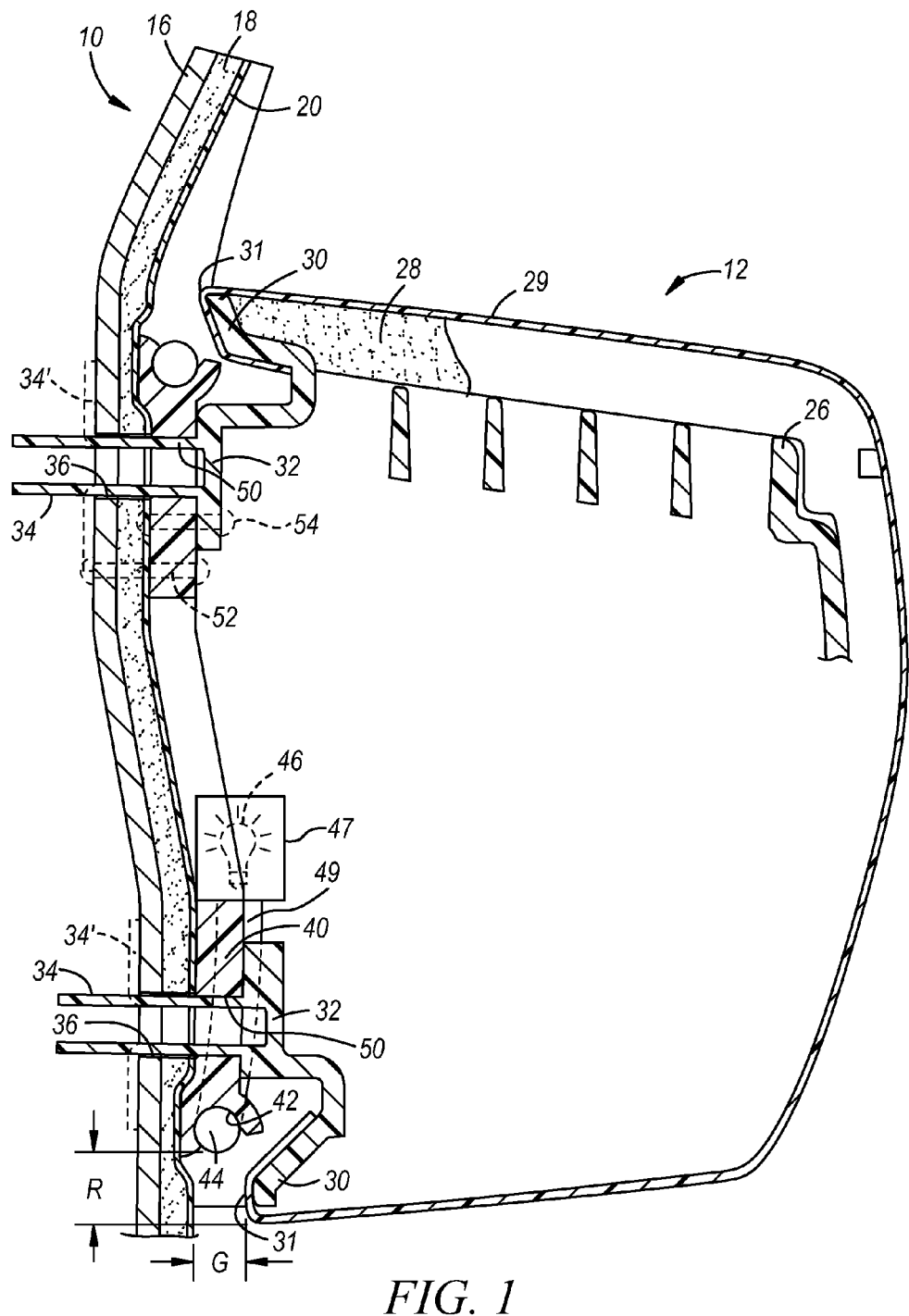
FIG. 1 is an elevation view showing a section through an armrest assembly with the provision of a light pipe for illuminating the vehicle interior.

Referring to FIG. 1, a vehicle door trim panel generally indicated at 10 is provided with an armrest assembly generally indicated at 12.

The door trim panel 10 is of conventional manufacture and includes a foundation panel 16, a layer of padding 18, and a trim cover 20 of vinyl, leather, plastic or fabric. The door trim panel 10 is mounted on the vehicle door by conventional fasteners, not shown.

The armrest 12 includes an injection molded armrest member 26, a layer of foam padding 28, and a vinyl or leather trim cover 29. The armrest member 26 has a rim structure 30 that extends around the periphery of the armrest member 26 and faces toward the door trim panel 10. The trim cover 29 wraps around the rim structure 30, providing an outboard peripheral corner 31 of the armrest that extends around the top, bottom, front and rear sides of the armrest 12, and faces toward the door trim panel 10. The armrest member 26 also has a mounting flange 32 integral with the rim structure 30. The mounting flange 32 extends around the periphery of the armrest and carries a plurality of fasteners 34 for attaching the armrest member 26 to the door trim panel 10. The fasteners 34 shown in FIG. 1 is are plastic cylinders that are molded integrally with the mounting flange 32 and extend through mounting holes 36 provided in the foundation panel 16 of the door trim panel 10. The molded plastic cylinders will be melted with a hot tool to the phantom position of FIG. 1 at 34' in order to attach the armrest member 26 to the door trim panel 10.

FIG. 1 also shows a light pipe mounting plate 40 that is captured, sandwiched, and inter-positioned between the armrest 12 and the door trim panel 10. The mounting plate 40 is of injection molded plastic construction and has a mounting channel 42 extending around the peripheral edge thereof. The mounting channel 42 is integrally molded with the mounting plate 40 and can be either continuous around the outer periphery of the mounting plate 40, or, alternatively, the mounting channel 42 can be comprised of a plurality of individual clip like features that are provided at spaced intervals around the periphery of the mounting plate 40.

A conventional light pipe 44 extends around the periphery of the mounting plate 40 and is retained within the mounting channel 42. The light pipe 44 is commercially available and is extruded of acrylic or polycarbonate. Or the light pipe can be fiber optic or a polymer based flexible light string. An LED or other light source 46 is mounted within a light source housing 47 carried on the mounting plate 40 and connected to the end 49 of the light pipe 44. In some cases, both ends of the light pipe can be connected to the light source housing 47. Light from the light source 46 travels along the light pipe 44 due to the internal reflection of the light within the length of the light pipe 44. The internally reflected light is exited from the light pipe 44 along the length thereof, thereby providing a continuous extending source of illumination. Reference may be had to U.S. Pat. No. 6,883,949 issued to Goto et.al, issued Apr. 26, 2005 for further description of a suitable light pipe.

As seen in FIG. 1, the mounting plate 40 rests against the door trim panel 10 and the mounting flange 32 of the armrest member 26 in turn rests against the mounting plate 40. The mounting plate 40 has holes 50 therein that receive the fasteners 34 so that the fasteners 34 of the armrest member 26 will attach both the armrest member 26 and the mounting plate 40 the door trim panel 10. In addition, as seen in FIG. 1, the presence of the mounting plate 40 causes the rim structure 30 of the armrest member 26 to be spaced away from the door trim panel 10 by the distance G, thereby creating a gap between the outboard peripheral corner 31 of the armrest 12 and the door trim panel 10. And, as seen in FIG. 1, the light pipe 44 is recessed from the outboard peripheral corner 31 of the armrest 12 by a distance R. Accordingly, light emitting from the light pipe 44 will transmit through the gap G and thereby providing a halo-like lighting effect surrounding the armrest 12. By recessing the light pipe 44 by the distance R, the light pipe 44 is recessed from direct view of the seated occupant, and yet will provide a soft halo of illumination of the door trim panel surrounding the armrest assembly.

Figure 2:
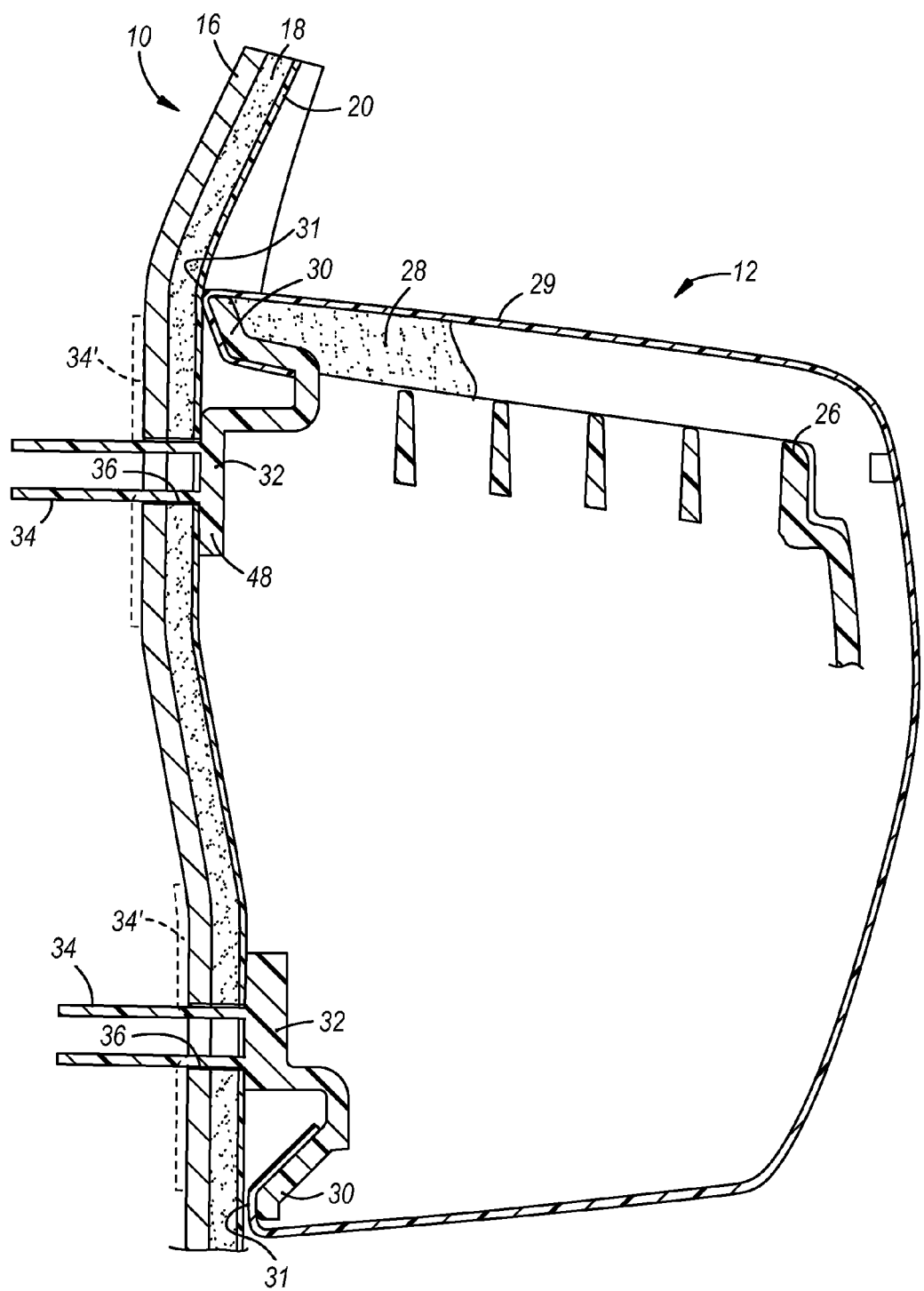
FIG. 2 is an elevation view similar to FIG. 1 but showing the omission of the light pipe of FIG. 1.

FIG. 2 is a view similar to FIG. 1. In FIG. 2, the mounting plate 40 is omitted from the assembly process. Thus, in FIG. 2, the fasteners 34 are attaching the armrest member 26 to the door trim panel without the inter-positioning of the mounting plate 40 between the mounting flange 32 of the armrest 12 and the door trim panel 10. Accordingly, the gap G that was present in FIG. 1 is nonexistent and the light pipe 44 is not present in the construction. When present, the mounting plate 40 acts as a spacer, and when not installed, there is no space.

In comparing FIGS. 1 and 2, it is seen that the invention has provided an armrest assembly that is easily customizable to either include or exclude the presence of an armrest lighting feature. Thus in FIG. 1, the mounting plate 40 is included in the assembly process and thereby the armrest lighting feature is readily provided for use in a luxury version of the automobile interior. However, in FIG. 2, by merely omitting the mounting plate 40, the gap G between the armrest 12 and door trim panel 10 is eliminated and an armrest assembly without lighting is provided for the standard version of the automobile interior.

The foregoing description of the invention as shown in the attached drawings is merely exemplary in nature and, variations thereof are intended to be within the scope of the invention. For example, in FIGS. 1 and 2 the fasteners 34 are shown as being cylinders integrally molded to the armrest assembly for making a heat-staked attachment. Other types of fasteners can be employed in the alternative, for example, screws, push in plastic fasteners, rivets, or the like. In addition, in FIG. 1 the fasteners 34 attach both the armrest member 26 and the mounting plate 40 the door trim panel 10 assembly. Alternatively, a separate plurality of fasteners 52, one of which is shown as a rivet in phantom lines, can be used to attach the mounting plate 40 to the door trim panel 10. And, if desired, a separate plurality of fasteners 54, one of which is shown as a rivet in phantom lines, can be used to attach the mounting plate 40 to the armrest member 26.

In addition, the foregoing description pertains to the example of an armrest mounted on a door trim panel. However, invention herein can be employed in the mounting of other vehicle interior accessories, such as the mounting of an overhead console on the vehicle roof trim panel or the mounting of a vehicle seat console on the floor panel between the seats. In the case of an overhead console, the console is mounted on the vehicle roof trim panel and the mounting plate that carries the light pipe can be installed for the luxury model vehicle and omitted from the base level vehicle. In the case of the console between the seats, the mounting plate that carries the light pipe is placed directly against the floor so that the halo lighting effect is adjacent the floor. Alternatively, floor panel will include a riser, and then the mounting plate is mounted between the riser and the console so that the halo lighting effect is located above the vehicle floor panel. Thus, in view of the foregoing it is seen that the invention provides a new and improved lighted interior accessory for a motor vehicle interior.

What is claimed is:

1. A lighted interior accessory assembly for mounting on a vehicle interior panel, comprising:
    an interior accessory having a rim structure including an outboard peripheral corner facing toward the vehicle interior panel and a mounting flange peripherally inboard of the outboard peripheral corner;
    a mounting plate being sandwiched between the mounting flange of the interior accessory and the vehicle interior panel so that the presence of the mounting plate creates a peripheral extending gap between the outboard peripheral corner of the interior accessory and the vehicle interior panel, said mounting plate having a mounting channel extending around the periphery of the mounting plate and located inboard of the outboard peripheral corner of the interior accessory so that the mounting channel is recessed within the gap between the outboard peripheral corner of the interior accessory and the vehicle interior panel;
    a light pipe configured to emit light along the length of the light pipe, said light pipe being mounted in the mounting channel of the mounting plate so that the light pipe is recessed within the gap between the outboard peripheral corner of the interior accessory and the vehicle interior panel and the light pipe is not directly viewed by a seated occupant;
    a plurality of fasteners mounting the mounting flange of the interior accessory on the vehicle interior panel;
    the outer peripheral corner of the interior accessory closely abutting the vehicle interior panel upon omission of the mounting plate from between the interior accessory and the vehicle interior panel so that there is no gap and no recess between the interior accessory and the vehicle interior panel and the light pipe is also omitted.

2. The lighted interior accessory assembly of claim 1 comprising said plurality of fasteners extending through holes in the mounting plate so that the plurality of fasteners mount both the interior accessory and the mounting plate on the vehicle interior panel.

3. The lighted interior accessory assembly of claim 1 further comprising the mounting plate carrying a light source providing light to at least one end of the light pipe.

4. The lighted interior accessory assembly of claim 3 comprising said plurality of fasteners extending through holes in the mounting plate so that the plurality of fasteners mount both the interior accessory and the mounting plate on the interior panel.

5. A method for installing an interior accessory on a vehicle interior panel, comprising:
    providing an interior accessory having a rim structure including an outboard peripheral corner facing toward the vehicle interior panel and a mounting flange peripherally inboard of the outboard peripheral corner;
    providing a mounting plate for optional interpositioning between the mounting flange of the interior accessory and the vehicle interior panel so that the presence of the mounting plate creates a peripheral extending gap between the outboard peripheral corner of the interior accessory and the vehicle interior panel, said mounting plate having a mounting channel extending around the periphery of the mounting plate and located inboard of the outboard peripheral corner of the interior accessory so that the mounting channel is recessed within the gap between the outboard peripheral corner of the interior accessory and the vehicle interior panel;

providing a light pipe configured to emit light along the length of the light pipe, said light pipe being mounted in the mounting channel of the mounting plate so that the light pipe is recessed within the gap between the outboard peripheral corner of the interior accessory and the vehicle interior panel and the light pipe is not directly viewed by a seated occupant;

and optionally inter-positioning the mounting plate between the interior accessory and the vehicle interior panel prior to mounting the interior accessory on the vehicle interior panel so that the presence of the mounting plate will create the gap between the interior accessory and the vehicle interior panel through which the light is emitted and the omission of the mounting plate will abut the outboard peripheral corner of interior accessory with the vehicle interior panel without a gap.

6. The method of claim 5 further comprising mounting the interior accessory on the vehicle interior panel by a plurality of fasteners extending through holes in the mounting plate so that the plurality of fasteners mount both the interior accessory and the mounting plate on the vehicle interior panel.

7. The method of claim 5 further comprising providing the mounting plate with a light source carried thereon and providing light to an end of the light pipe.

\* \* \* \* \*